Jan. 5, 1937.   D. H. SCHWEYER   2,066,744
AUTOMATIC TRAIN CONTROL
Original Filed July 31, 1924
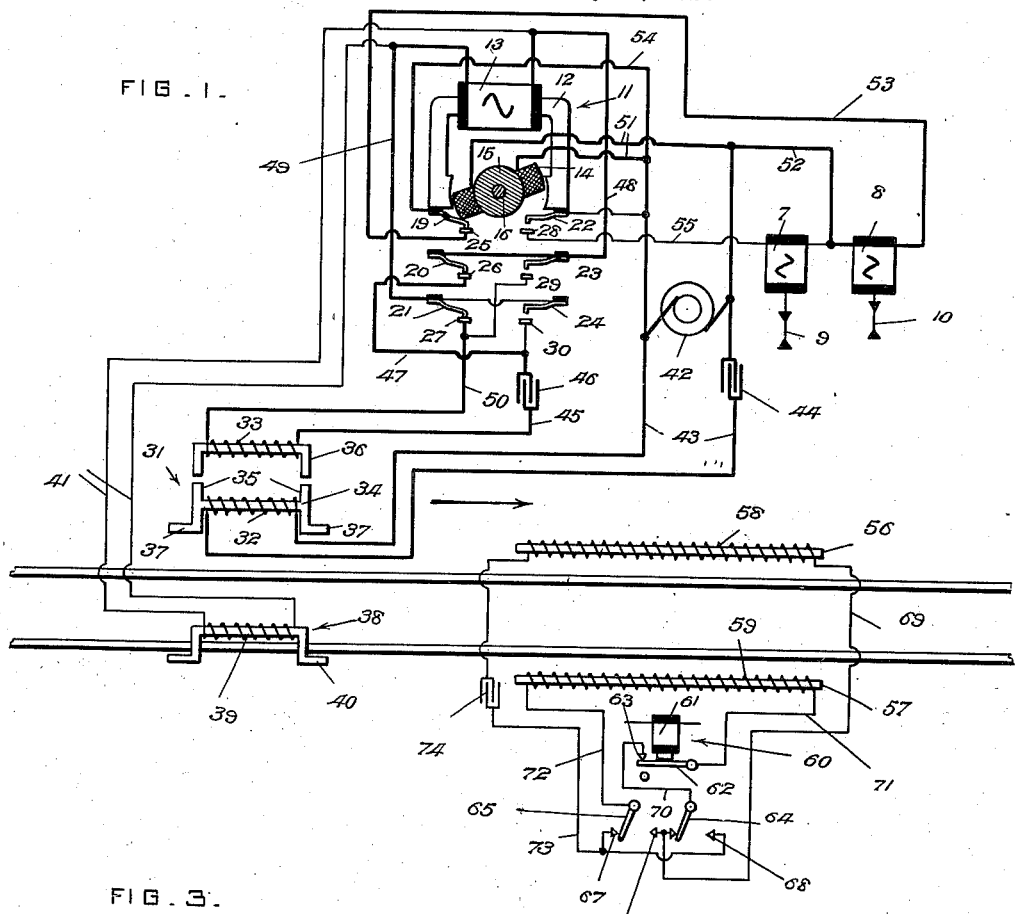
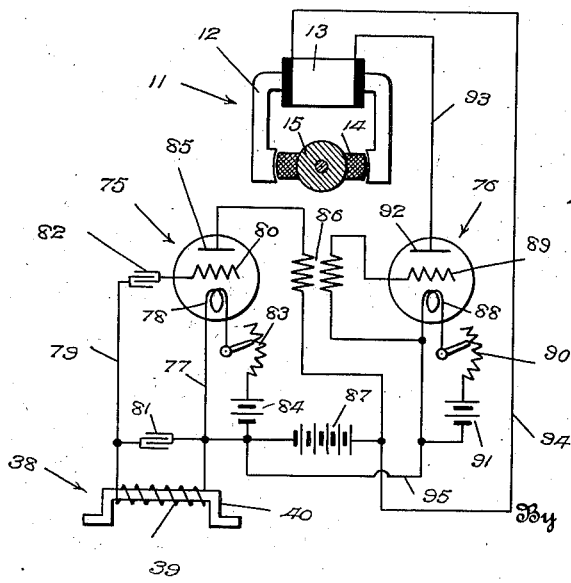
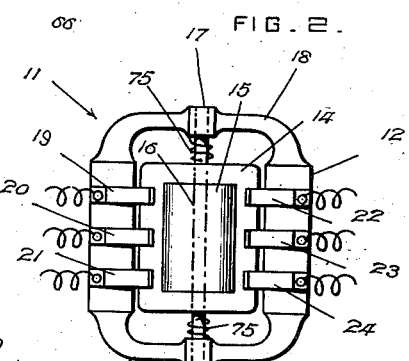
Inventor:
D. H. SCHWEYER,
By Monroe C. Miller
Attorney.

Patented Jan. 5, 1937

2,066,744

UNITED STATES PATENT OFFICE 2,066,744

AUTOMATIC TRAIN CONTROL

Daniel Herbert Schweyer, Easton, Pa., assignor to Schweyer Electric & Manufacturing Co., Easton, Pa., a corporation of Pennsylvania Application July 31, 1924, Serial No. 729,374
Renewed June 1, 1936

3 Claims. (Cl. 246—194)

The present invention relates to automatic train control, and aims to provide a novel and improved apparatus of that kind operable under the induction principle, and eliminating trips, ramps and other contact devices between the track and train.

The primary object of the invention is the provision in an automatic train control apparatus, in combination with means for obtaining or initiating a danger or other predetermined condition of the vehicle equipment whenever passing a control station of the track, simple and effective means for avoiding such condition and obtaining a clear, caution or other condition of the vehicle equipment; the first named means being operable in a reliable manner for obtaining the danger or other corresponding vehicle condition whenever passing a control station, to assure of the train being stopped or retarded, and the second named means only being operable or effective when so intended and with the apparatus in the proper operative condition.

Another object of the invention is the provision of novel inductive control apparatus requiring no battery or source of electrical energy on the track or roadway, the source of energy being carried by the train or vehicle and the energy being transmitted from the train to the track devices and reflected back to the vehicle equipment under certain conditions, such as for establishing caution or clear conditions.

A further object is the provision of such an apparatus embodying an alternating current relay in the vehicle equipment controlling the different conditions of vehicle control, with cooperative induction elements on the train and track receiving energy from the source of alternating current and controlling such relay to obtain the different conditions of control by the control of the track elements.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is a diagrammatical view of the apparatus.

Fig. 2 is a plan view of the relay.

Fig. 3 is a diagrammatical view illustrating a modification in the connection between the relay and pick-up or receiving element of the vehicle equipment.

Vehicle equipment

The train or vehicle equipment, carried by the locomotive or other car of the train, includes a motor type relay 11 which has under control the means which control the vehicle. Such means include the electro-magnets 7 and 8 having under their influence the respective valves 9 and 10 of a pneumatic mechanism (not shown), which forms no part of the present invention, inasmuch as the magnets 7 and 8 can control any suitable mechanism for establishing or indicating danger, caution and clear or other desired conditions. In the arrangement as shown clear or running conditions are established or indicated when the magnet 8 is energized, caution conditions are established or indicated when the magnet 7 is energized with the magnet 8 deenergized, and danger conditions are established or indicated when both magnets are deenergized.

The relay 11 includes the U-shaped core 12 on which is mounted the field coil 13, and an armature coil 14 is disposed between the poles or terminals of the core 12. The coil 14 is disposed on and surrounds an armature 15 mounted on a shaft or arbor 16 that is mounted for rotation in bearings 17 carried by suitable brackets 18. The armature 15 and coil 14 are mounted for turning movement about the axis of the shaft 16 extending transversely or at right angles to the path of the flux between the poles of the core 12, with the axis of the coil 14 at right angles to the shaft 16 and at an angle with the path of the flux between said poles. The opposite longitudinal portions of the coil 14, which are parallel with the shaft 16, are disposed adjacent to the poles of the core 12, so that when the coil 14 is energized said coil will be given a torque by being disposed in the path of the magnetic flux between the poles of the core 12 created by the coil 13 when energized.

A set of spring switches 19, 20 and 21 are arranged to be closed by the coil 14 when it turns in one direction from neutral or intermediate position, and a second set of spring switches 22, 23 and 24 are adapted to be closed by said coil when it turns in the opposite direction from neutral or intermediate position. Thus, the two sets of switches are alternately closed by the movement of the coil 14 in opposite directions beyond intermediate or neutral position. As shown, the switches are carried by the terminals of the core 12, being insulated therefrom, with the free terminals of the switches projecting to be engaged by the opposite portions of the coil 14, although various kinds of circuit controlling means can be used. The switches 19, 20, 21, 22, 23 and 24, when closed, are moved into engagement with the corresponding contacts 25, 26, 27, 28, 29 and 30.

The field coil 13 of the relay is normally energized while travelling through a block or between control stations or locations of the track, through the medium of a transformer 31 including a primary coil 32 wound on a core 34 and a secondary coil 33 wound on a core 36, said cores being spaced apart and the terminals of the core 36 being directed toward the corresponding poles 35 of the core 34, said core 34 having opposite poles 37 to pass closely adjacent to a track element, as will hereinafter more fully appear. Normally, when travelling through a block or between control stations, the core 34 is spaced sufficiently far from the rails and other magnetic objects on the track so that the magnetic flux created in the core 34 passes through the core 36, so that alternating current from the primary circuit is induced in the circuit of the coil 33.

In addition to the transformer 31, which is cooperable with the track device at each control station, the vehicle equipment includes a receiver or pick-up element 38 including the coil 39 wound on the core 40 adapted to pass closely adjacent to another element of the track device, as will hereinafter more fully appear. The coil 39 is connected by the wires or conductors 41 with the terminals of the field coil 13, thus connecting the coils 13 and 39 in circuit with one another. The coil 39 is normally deenergized and, as will hereinafter more fully appear, receives its energy by induction from the track device when the track device is energized by the transmitting coil 32.

The coil 32 is continuously energized by an alternating current generator 42 carried by the vehicle, the terminals of the coil 32 and generator 42 being connected by the wires or conductors 43, and a condenser or capacity 44 being preferably disposed in one of said conductors to regulate the power factor and balance the impedance. In this way, the coil 33 is energized, by induction, from the coil 32 when travelling in a block or between control stations, and the field coil 13 of the relay is normally energized from the coil 33, said coils 13 and 33 being disposed in a circuit including the coil 33, conductor 45, condenser or capacity 46, conductor 47, contact 26, switch 20, conductor 48, coil 13, conductor 49, switch 21, contact 27 and conductor 50, it being understood that under clear or running conditions the coil 14 is turned, as seen in Fig. 1, to close the switches 19, 20 and 21.

The coil 14 is continuously energized from the generator 42, the terminals of said coil being connected by the wires or conductors 51 with the opposite poles of the generator.

In such position of the coil 14, the circuit of the magnet 8 is closed, and such circuit includes the generator 42, conductor 52, magnet 8, conductor 53, contact 25, switch 19, and conductor 54. The magnets 7 and 8 are alternating current magnets.

The conductor 52 is connected to both magnets 7 and 8, and the conductor 54 is connected to both switches 19 and 22, while the contact 28 is connected by the conductor 55 with the magnet 7. Thus, when the coil 14 is reversed so as to close the switches 22, 23 and 24, the circuit of the magnet 8 is broken at the switch 19, while the circuit of the magnet 7 is closed at the switch 22, the circuit of the magnet 7 including the generator 42, conductor 52, magnet 7, conductor 55, contact 28, switch 22 and conductor 54. It will be apparent that when the coil 14 is in intermediate or neutral position, with both sets of switches open, both magnets 7 and 8 will be deenergized.

*Track device*

The track or roadside elements comprise the longitudinal cores 56 and 57 parallel with the rails, and the coils 58 and 59 wound on the respective cores. Said elements can be located at opposite sides of the track, or between the rails, and the cores 34 and 40 of the vehicle equipment are arranged to move closely adjacent to or over the cores 56 and 57, respectively.

A polarized relay 60 is employed for connecting the coils 58 and 59 in reversed connections and for opening the circuit between said coils under danger or similar conditions. The relay 60 includes an electro-magnet 61 controlled by the wayside signal apparatus or by any other suitable means which forms no part of the present invention, whereby the magnet 61 is deenergized under danger or corresponding traffic conditions, is energized by current flowing in one direction for caution conditions, and is energized by current flowing in the opposite direction for clear conditions. The magnet 61 controls a neutral switch 62 which is held against a contact 63 when said magnet is energized by the flow of current in either direction, and said magnet controls polarized reversing switches 64 and 65. When current flows through the magnet 61 in one direction, the switches 64 and 65 are thrown or swung in one direction, such as toward the left, as seen in Fig. 1, to engage the respective double contact 66 and contact 67, whereas when the current flows through the magnet 61 in the opposite direction the switches 64 and 65 will be thrown or swung in the opposite direction, or toward the right, as seen in Fig. 1, against the respective contacts 68 and 66. The switches 64 and 65 are used for reversing the connections between the coils 58 and 59. Thus, with the switches 64 and 65 engaging the contacts 66 and 67, respectively, as seen in Fig. 1, the circuit between the coils includes the coil 58, conductor 69 connected to the forward or right hand end of said coil 58, contact 66, switch 64, conductor 70, contact 63, switch 62, conductor 71 connected to the forward or right hand end of the coil 59, said coil 59, conductor 72 connected to the rear or left hand end of the coil 59, switch 65, contact 67, and conductor 73 connected to the rear or left hand end of the coil 58. The conductor 73 includes the condenser or capacity 74 to offset or neutralize the impedance or reactance due to the coils. Thus, in such position of the switches 64 and 65, the forward ends of the coils 58 and 59 are connected with one another and the rear ends of said coils are also connected. However, when the switches 64 and 65 are reversed so as to engage the respective contacts 68 and 66, the ends of the coil 58 will now be connected with the opposite ends of the coil 59, the circuit including the coil 58, conductor 69, contact 66, switch 65 in its right hand position, conductor 72, coil 59, conductor 71, switch 62, contact 63, conductor 70, switch 64 in its right hand position, contact 68, and conductor 73.

The coil 58 is a receiving coil of the track device, while the coil 59 is a transmitting coil, inasmuch as the coil 58 is adapted to be energized by induction from the coil 32 of the vehicle equipment, to energize the coil 59, and the coil 59 is adapted to transmit energy, by induction, to the coil 39, when passing the control station with the cores 34 and 40 of the vehicle equipment passing over the cores of the track device.

Operation

*Normal running or clear conditions.*—When the train is proceeding under normal running or clear conditions in a block or between control stations, with the armature coil 14 supplied with alternating current from the generator 42, alternating current is induced in the circuit of the coil 33 from the primary transformer coil 32, said coil 32 being energized simultaneously with the coil 14 from the generator. The circuit of the coil 33 includes said coil, conductor 45, contact 26, conductor 48, coil 13, conductor 49, switch 21, contact 27 and conductor 50. The field coil 13 is thus energized by alternating current with the sine wave representing the energizing current of the coil 13 in a predetermined relation with the sine wave representing the energizing current of the coil 14, so that the alternating magnetic flux passing through the coil 14 between the poles or terminals of the core 12, will result in the coil 14 receiving a torque to move it in the direction to close the switches 19, 20 and 21. This position of the coil 14 is maintained while travelling under clear or normal running conditions, the coils 13, 14, 32 and 33 being properly wound so that the coil 14 is turned as described. The circuit of the magnet 8 is closed to establish or indicate clear conditions, such circuit including the generator 42, conductor 52, magnet 8, conductor 53, contact 25, switch 19, and conductor 54.

*Danger conditions.*—When a block of the track in advance of a control station is under danger conditions, the relay magnet 61 at the entrance end of the block is deenergized, whereby the switch 62 is open and the switches 64 and 65 in neutral position out of engagement with their contacts. The coils 58 and 59 are therefore disconnected, and the same result is obtained by the breaking of any of the conductors of the track device, or by short circuits or grounds, so that protection is had against false clear or caution conditions.

Now, as the vehicle proceeds past the control station, the cores 34 and 40 move over the cores 56 and 57, respectively, of the track device. The core 34 moving over the core 56 will result in the coil 33 being deprived of some of its energy from the coil 32, inasmuch as the greater portion of the magnetic flux in the core 34 will pass through the core 56. The relation of the cores 34, 36 and 56 under these conditions is such that a differential action is obtained, so as to deprive the coil 33 of induced current when passing the control station. As a result, the coil 33 failing to receive its allotment of electrical energy from the coil 32, when passing the core 56, the coil 13 becomes deenergized sufficiently to weaken the magnetic flux flowing in the core 12 of the relay, so that the coil 14 is moved to intermediate or neutral position by its springs 75, disposed between the shaft 16 and bearings 17. Although energy from the coil 32 will transmit magnetic flux from the core 34 into the core 56 no current is induced in the coil 58 because its circuit is open, and the coil 59 is disconnected from the coil 58 so that the coil 59 remains deenergized, thereby failing to energize the coil 39 of the receiver 38. Consequently, the field coil 13 can receive no energy from the receiving coil 39 during the time that the coil 33 is deenergized when passing the track device.

As a result, the switches 19, 20 and 21 are opened, thereby opening the circuit of the magnet 8 and said magnet becomes deenergized, thereby establishing or indicating danger conditions.

After passing the control station, although the coil 33 is again energized from the coil 32, the circuit between the coils 33 and 13 is broken at the switches 20 and 21, so that the coil 13 cannot be reenergized from the coil 33 after a danger indication or condition is established.

*Clear conditions.*—When the track is clear ahead, the current flows through the relay magnet 61 in one direction, say, for example, to move the switches 64 and 65 into engagement with the contacts 66 and 67, respectively, and the switch 62 will also be closed.

Now, when the core 34 moves over the core 56, although the coil 33 is deprived of sufficient of its energy to at least partially deenergize the coil 33 and release the armature coil 14, the coil 32 induces alternating current in the coil 58 by the alternating magnetic flux transmitted from the core 34 through the core 56 as the vehicle moves past the control station, and such alternating current flows through the transmitting coil 59. From the coil 59 the current is transmitted by induction into the receiving coil 39, inasmuch as the magnetic flux created in the core 57 passes through the core 40 as it moves over the core 57. Consequently, although the coil 13 is at least partially deprived of energy from the coil 33, it is now supplied with energy from the receiving coil 39, such energy being transmitted from the coil 32 to the track device and being reflexed back to the vehicle equipment. Under these conditions, the energy received by the coil 39 and transmitted to the field coil 13 will establish a sine wave in the coil 13 the same as the sine wave established by the transmission of energy by way of the coil 33. As a result, the armature coil 14 will remain in its clear position to hold the switches 19, 20 and 21 closed, thereby maintaining clear or free running conditions. The coil 58 is such that when its circuit is closed, it will not create such a "bucking" action as to completely prevent the shunting of the magnetic flux from the core 36. The relation of the coils 32, 33 and 58, and their cores is such, that when the coils 32 and 33 are over the coil 58 with the circuit of the coil 58 closed, sufficient flux will be shunted from the core 36 by the core 56 to obtain a sufficient deenergization of the coil 13 to obtain the initiating effect. The circuit of the coil 58 includes the condenser or capacity 74 so as to be resonant, and the convolutions of the coil 58 may be spaced so as to permit of the shunting of the magnetic flux from the core 36 through the core 56 even though the circuit of the coil 58 is closed. The shunting of the magnetic flux may not be as large when the circuit of the coil 58 is closed as when such circuit is open, but the coils may be adjusted or such windings used that there will be at least a partial deenergization of the coil 13 under the different conditions described to obtain the initiating effect, or the releasing of the armature coil 14.

When the vehicle devices have passed the track elements, so that the coil 39 is deenergized, the coil 33 will be immediately fully reenergized, to keep the field coil 13 energized.

The armature coil 14 is sufficiently slow-acting, when the core 34 moves beyond and is removed from the core 56, to prevent the coil 14 being released when the supply of energy for the coil 13 is changed from the coil 33 to the coil 39 or back from the coil 39 to the coil 33.

*Caution conditions.*—Under track conditions requiring the vehicle to proceed under caution control after passing the control station, the magnet 61 receives current in a direction to reverse the switches 64 and 65, and they will move against the respective contacts 68 and 66, thereby reversing the connections between the receiving and transmitting coils 58 and 59, respectively, of the track device.

Therefore, when the core 34 moves over the core 56, the coil 33 is at least partially deenergized the same as under clear conditions, but alternating current from the coil 32 is induced in the coil 58 and flows through the coil 59. However, due to the reversal in the connections between the coils 58 and 59, the alternating current flowing in the coil 59 will be reverse to that under clear conditions. In other words, under caution conditions the sine wave of the current flowing in the coil 59 will be reverse to that under clear conditions. Consequently, the alternating current induced in the coil 39 from the coil 59 will be reversed, which will also reverse the sine wave of the current flowing in the field coil 13. This reverses the alternating magnetic flux in the core 12 with reference to the sine wave of the current flowing through the armature coil 14. As a result, the coil 14 is given a torque in the opposite direction, as compared with clear conditions, and said coil 14 will therefore turn reversely, to release the switches 19, 20 and 21 and to close the switches 22, 23 and 24. This establishes or indicates caution conditions by deenergizing the magnet 8 and energizing the magnet 7.

The switch 19 being opened will break the circuit of the magnet 8, and the switch 22 being closed, will establish the circuit of the magnet 7, such circuit including the generator 42, conductor 52, magnet 7, conductor 55, contact 28, switch 22, and conductor 54.

After passing the control station, the coil 14 is maintained in caution position to hold the switches 22, 23 and 24 closed. Thus, after the track devices have passed from the track elements, so that the coil 33 is again fully reenergized from the coil 32, the connections between the coils 33 and 15 will have been reversed by the reversal of the coil 14, it being noted that the conductor 45 is connected to the contacts 26 and 30 while the conductor 50 is connected to the contacts 27 and 29. Also, the conductor 48 is connected to both switches 20 and 23 and the conductor 49 is connected to both switches 21 and 24. Therefore, when the switches 22, 23 and 24 are closed, the connection between the coils 13 and 33 is reversed to correspond with the reversal in connections between the coils 58 and 59, so that the coil 13 is energized from the coil 33 with the sine wave reversed as compared with clear conditions. The circuit between the coils 33 and 13 now includes the coil 33, conductor 45, contact 30, switch 24, conductor 49, coil 13, conductor 48, switch 23, contact 29 and conductor 50. The switches 20, 21, 23 and 24 thus provide reversing switches between the coils 33 and 13 to reverse the connections between said coils for caution conditions, thereby maintaining the coil 14 in position to hold the switches 22, 23 and 24 closed.

When proceeding under either clear, caution or danger conditions past a control station, the control of the vehicle or train can be changed to any other condition, inasmuch as a danger condition is always initiated when passing the control station, and either clear or caution conditions can be established depending on the relay 60 of the track device.

The track device requires no battery or source of energy other than the alternating current received by induction from the vehicle or train equipment, and alternating current supplied by a single source is utilized for all of the energized or translating devices of the apparatus.

*Modification*

Fig. 3 illustrates a modification in the connection between the receiving coil 39 and the field coil 13, the other connections (not shown) being the same as shown in Fig. 1. Audions or electrical valves 75 and 76 are used. Thus, the opposite terminals of the coil 39 are connected by the conductor 77 with the filament 78 of the valve 75, and by the conductor 79 with the grid 80 of said valve. A condenser 81 is bridged across the conductors 77 and 79, and a condenser 82 is also disposed in the conductor 79. The filament 78 is disposed in circuit, as usual, with the rheostat 83 and battery 84. The plate 85 of the valve 75 is connected in series with the primary winding of a transformer 86 and with one pole of a battery 87 which has its other pole connected to the conductor 77. The secondary winding of the transformer 86 is connected to the filament 88 and grid 89 of the valve 76, and said filament 88 is connected in circuit with the rheostat 90 and battery 91. The plate 92 of the valve 76 is connected by a conductor 93 with one terminal of the coil 13, and the other terminal of the coil 13 is connected by a conductor 94 with one pole of the battery 87, the other pole of said battery being connected by the conductor 95 with the filament 88.

As well understood, when the filaments 78 and 88 are energized, the flow of energy between the grids and filaments will result in the corresponding flow of greater electrical energy between the plates and filaments, so that feeble electrical energy can be stepped up to any power desired, by the use of a suitable number of audions or valves and corresponding circuits. Thus, when the coil 39 is energized by alternating current from the track device, the flow of energy between the filament 78 and grid 80, will result in the flow of corresponding greater energy from the battery 87 between the plate 85 and filament 78 and through the primary of the transformer 86, and such energy is transmitted by the transformer to flow between the filament 88 and grid 89 of the next audion or valve. As a result, corresponding greater energy flows from the battery 87 between the plate 92 and filament 88, and through the coil 13. This arrangement can be used with any number of audions or valves, so that a feeble current picked up by the coil 39 will be made effective to control the field coil 13 of the relay.

Any number of audion valves or similar devices can be used for obtaining selective control, such as disclosed in my copending application Serial No. 709,140, filed April 26, 1924, or by arrangements known in the art.

Sine waves referred to hereinbefore and in the appended claims may be of any shape, either regular or irregular, suitable for the purpose, so that the term "sine wave" is to be taken broadly for different kinds of alternating or fluctuating current.

In lieu of the electrical relay 60, the switches 62, 64 and 65 may be operated manually, pneumatically, mechanically or otherwise, as well as electrically, for controlling the vehicle equipment from the track.

Having thus described the invention, what is claimed as new is:—

1. In a vehicle control apparatus, a receiver comprising primary and secondary cores, one of said cores being H-shaped, a primary winding on one core, and a secondary winding on the other.

2. In a vehicle control apparatus, a receiver comprising a magnet core having an H-shaped portion, a substantially U-shaped magnet core disposed thereover in spaced relation therefrom, a winding on the cross-bar of said H-shaped portion, and a winding on said U-shaped core.

3. In a vehicle control apparatus, a receiver comprising a pair of spaced magnet cores, each having a longitudinal portion and a pair of legs extending laterally from the ends thereof, said cores being arranged with said body portions in spaced parallel relationship and said legs extending towards each other, a primary winding on one of said cores, and a secondary winding on the other.

DANIEL HERBERT SCHWEYER.